(12) United States Patent
Smith

(10) Patent No.: US 6,751,685 B2
(45) Date of Patent: Jun. 15, 2004

(54) E1/T1 TO ASYNCHRONOUS COMMUNICATIONS INTERFACE

(75) Inventor: William Smith, Lindenhurst, NY (US)

(73) Assignee: Telephonics Corporation, Farmingdale, NY (US)

( * ) Notice: Subject to any disclaimer, the term of this patent is extended or adjusted under 35 U.S.C. 154(b) by 212 days.

(21) Appl. No.: 09/837,520

(22) Filed: Apr. 18, 2001

(65) Prior Publication Data

US 2002/0156948 A1 Oct. 24, 2002

(51) Int. Cl.[7] .......................... G06F 3/00; G06F 13/00
(52) U.S. Cl. ...................... 710/52; 710/55; 710/5; 710/62; 710/64; 710/65
(58) Field of Search .................. 710/52, 54, 5, 710/62, 64, 65, 72

(56) References Cited

U.S. PATENT DOCUMENTS

| | | | |
|---|---|---|---|
| 5,537,533 A | * | 7/1996 | Staheli et al. .................. 714/5 |
| 5,666,330 A | * | 9/1997 | Zampetti ..................... 368/47 |
| 5,935,220 A | * | 8/1999 | Lumpkin et al. .............. 710/5 |

* cited by examiner

Primary Examiner—Jeffrey Gaffin
Assistant Examiner—Joshua D Schneider
(74) Attorney, Agent, or Firm—Thomas A. O'Rourke; Bodner & O'Rourke

(57) ABSTRACT

The present invention is primarily directed to rail car communication system and in particular communication system used to transfer data and voice communications from one car to another. The present invention has particular applicability for use in subway cars. A communication system using an E1 protocol is provided with an interface device which translates data received from a hardware device having, inter alia, a microprocessor and a universal asynchronous receiver transmitter (UART) used for serial communications such as COM 1–4. The asynchronous UART data is interfaced with the E1 channel. UART data transfers are usually done on a byte (8 bits) by byte basis but the present invention uses E1 timing and bit by bit communications. Additionally, data is normally sent at the data rate of the E1 channel not some other unrelated speed such as those used by a UART during serial communications. Also, the data is usually sent synchronously, like the E1 channel, not asynchronously, as with a UART.

15 Claims, 23 Drawing Sheets

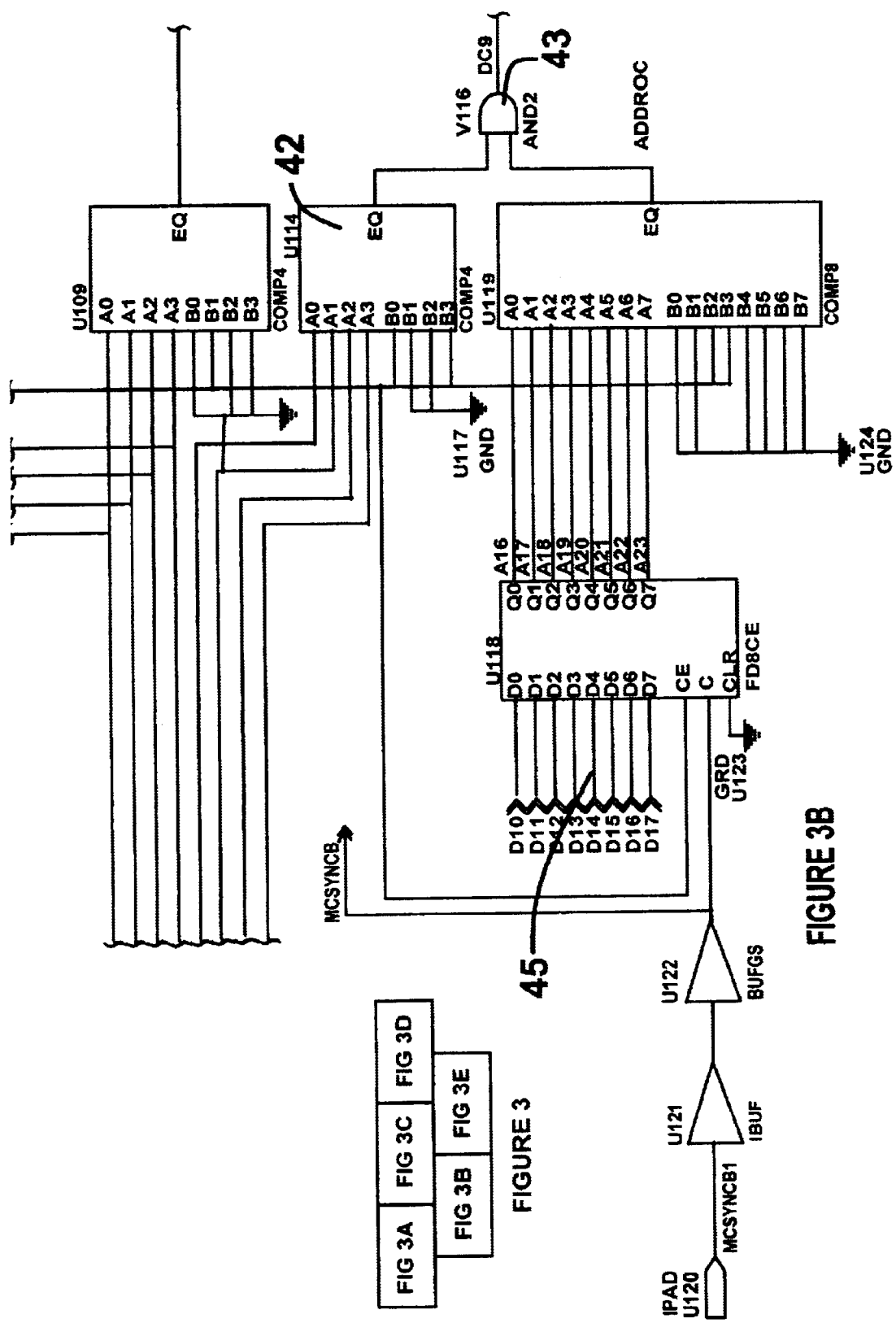

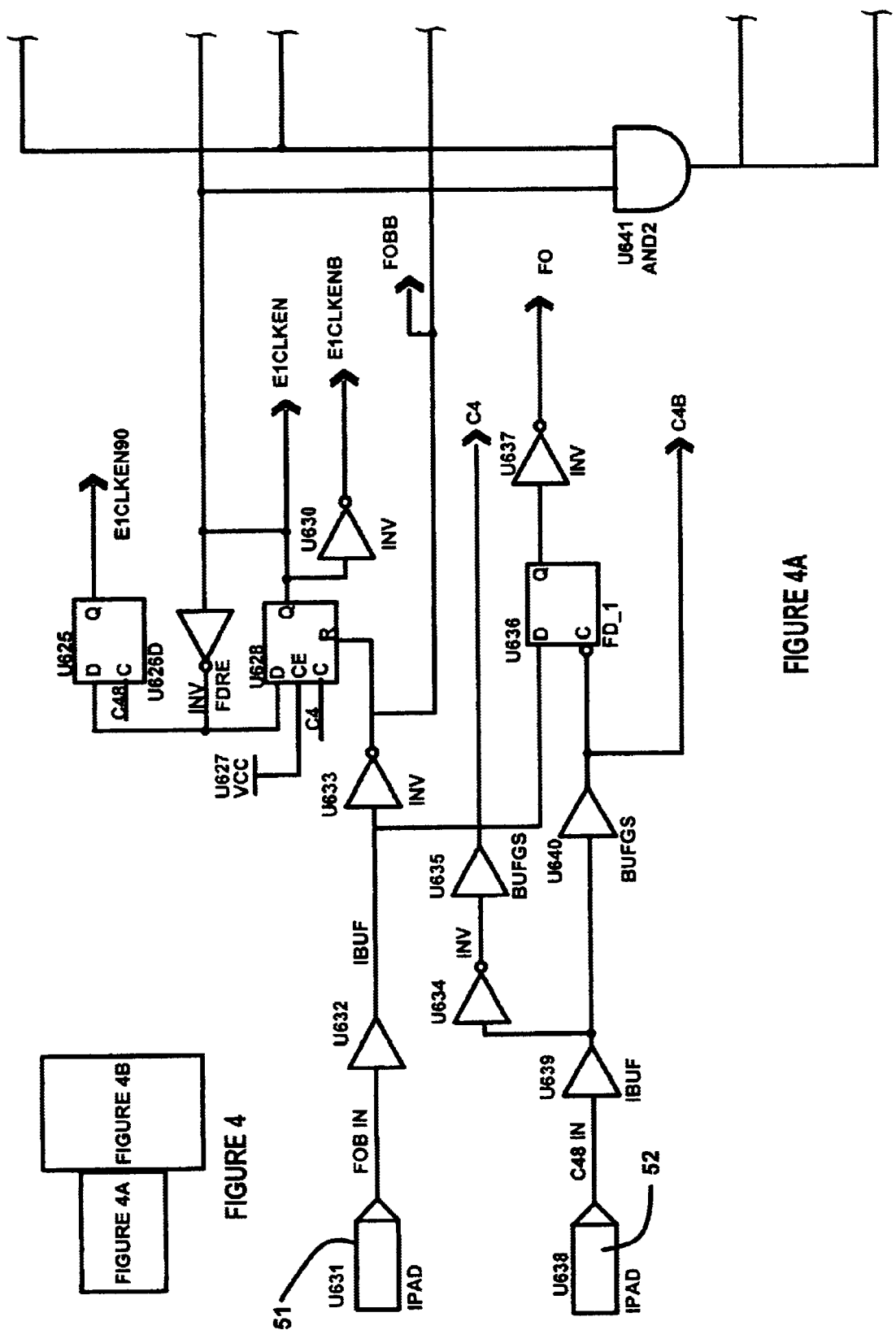

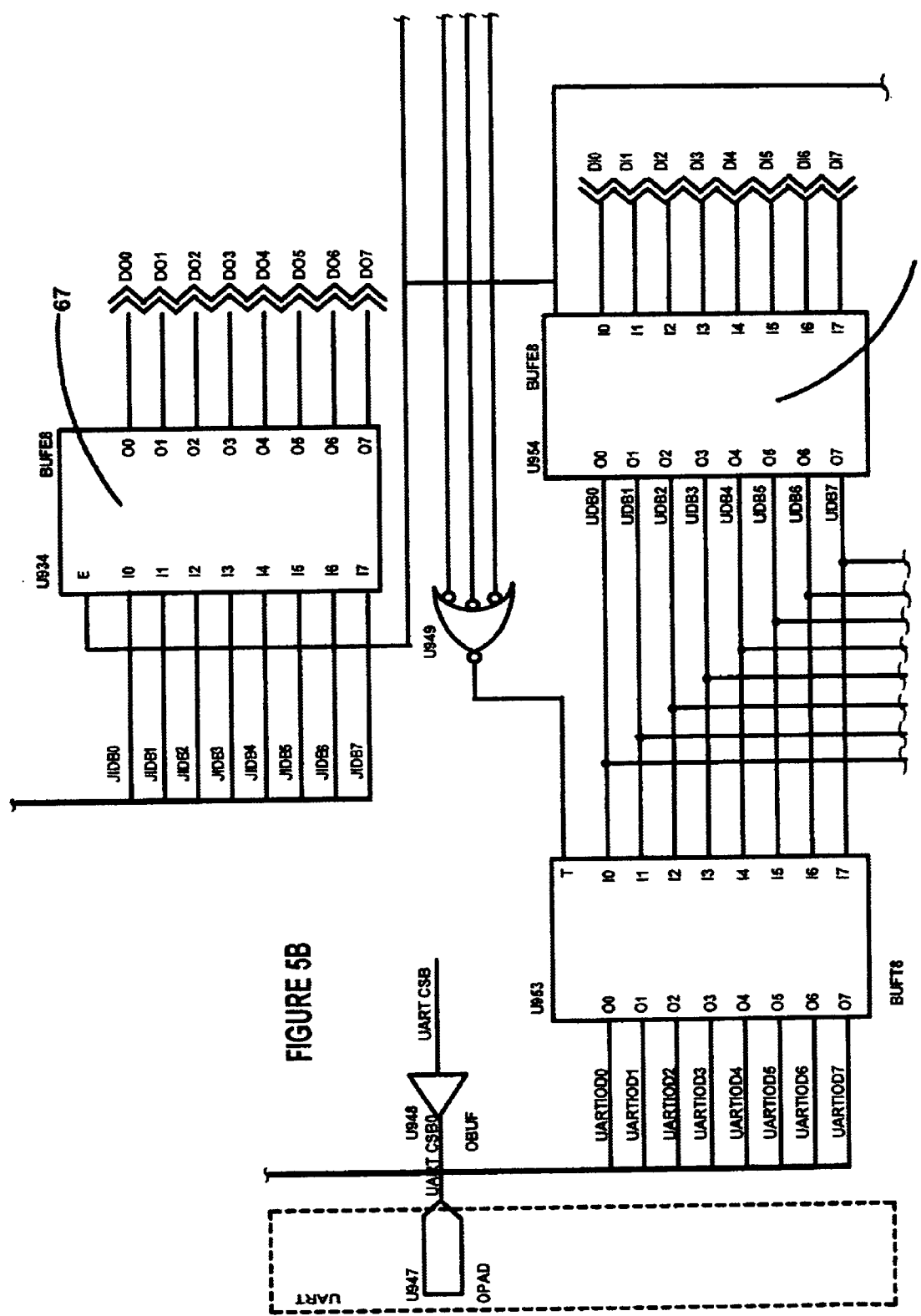

E1/T1 TO ASYNCHRONOUS COMMUNICATIONS INTERFACE

FIELD OF THE INVENTION

The present invention relates to improvements in communications between communication devices using different protocols and in particular rail car data communications.

BACKGROUND INFORMATION

Data communications in the field of communications, including data communications between rail cars are generally transmitted in a bit serial communication format through a network. Typically data is transmitted in a network between two data endpoints and the data is packaged according to specific data communications protocols so as to facilitate transmission of the data across the particular network. The particular packaging may include network management and other information such as headers and trailers to the information transmitted to facilitate transmission of the data based on the requirements of the particular protocol that is being used. Framing is a term that is used to describe the packaging of data by a protocol for transmission.

There are a number of different protocols available for data transmission. Some of these protocols may include data transmission using time division multiplexing (TDM) approaches using standards such as T1 and E1 which are well known in the art. Another example standard may include high level data link control (HDLC) or asynchronous transfer mode (ATM). Each of these protocols are used in their own types of applications and have goals in terms of history, performance, error immunity, flexibility and other factors that creates preferences for one over another protocol. As a result, each of these protocols employ framing procedures by which data is packaged for transmission across the various networks in which they are employed. For the most part these protocols are generally incompatible and require that there be a translation or conversion to transmit data in a transmission link that employs two or more protocols in two or more segments of the communication path.

Operating systems in rail cars are becoming increasingly sophisticated. In many instances microprocessors are commonly used to control various operational functions. In addition, communication systems in these rail cars have also become relatively advanced, particularly in the area of car to car and passenger communication systems that permit telephone communications between the moving rail car and wireless base stations or land lines.

The communications systems in rail cars typically employ a E1/T1 transmission system. A problem arises when additions are made to the communications system that do not employ the E1/T1 protocol for communicating. For example, a user may attempt to add an off the shelf hardware such as a computer, modem or other device that does not use the E1/T1 protocol. Many of these off the shelf hardware device use serial channels (Com ports) that employ asynchronous TTY type formats, i.e., a start bit, 5 through 8 data bits, one or two stop bits and some parity bit options. When hardware that is not compatible with the E1/T1 protocol is added there can be significant downtime to equipment before it is realized by the installer that there is an incompatibility and in attempting to correct the incompatibility between the added hardware and the system currently in use. One reason why off the shelf hardware is attractive to the transit system running the rail cars is the cost savings that arises from the ability to use an item that is off the shelf as opposed to one that is not. When the savings are multiplied across a fleet of rail cars the savings to the transit authority can be significant. Another advantage to off the shelf hardware is the availability of replacements in the event of a failure of a part. The off the shelf items are usually available from a variety of convention sources thus reducing a car's down time waiting for parts delivery.

OBJECTS OF THE INVENTION

It is an object of the invention to permit a synchronous communication system to communicate with an asynchronous communication system.

It is an object of the invention to provide an interface device to permit a synchronous communication system to communicate with an asynchronous communication system.

It is another object of the invention to permit a communication system using an E1/T1 protocol to communicate with a communication system using a non E1/T1 protocol.

It is an object of the invention to permit an E1/T1 based communications system to communicate with non E1/T1 based hardware having a universal asynchronous receiver transmitter.

It is a still further object of the invention to permit a rail car having a communication system using an E1/T1 protocol to communicate with a communication system using a non E1/T1 protocol.

SUMMARY OF THE INVENTION

The present invention is primarily directed to rail car communication system and in particular communication system used to transfer data and voice communications from one car to another. The present invention has particular applicability for use in subway cars. However, one skilled in the art will appreciate that the teachings of the present invention are pertinent to other types of communication systems besides those used in rail cars.

According to the present invention a communication system using an E1/T1 protocol is provided with an interface device, which translates data received from hardware device having, inter alia, a microprocessor and a universal asynchronous receiver transmitter (UART) used for serial communications such as COM 1–4. The transmitter can be a typical UART that is commonly found on conventional personal computers (PC's). The asynchronous UART data is interfaced with the E1/T1 channel. E1/T1 communications is usually done on a byte (8 bits) by byte basis but the present invention uses bit by bit communications instead of the byte by byte transmission. Additionally, data is normally sent at the data rate of the E1/T1 channel not some other unrelated speed such as those used by a UART during serial communications. Also, the data is usually sent synchronously, like the E1 channel, not asynchronously, as with a UART.

DETAILED DESCRIPTION OF THE INVENTION

Figure 1:
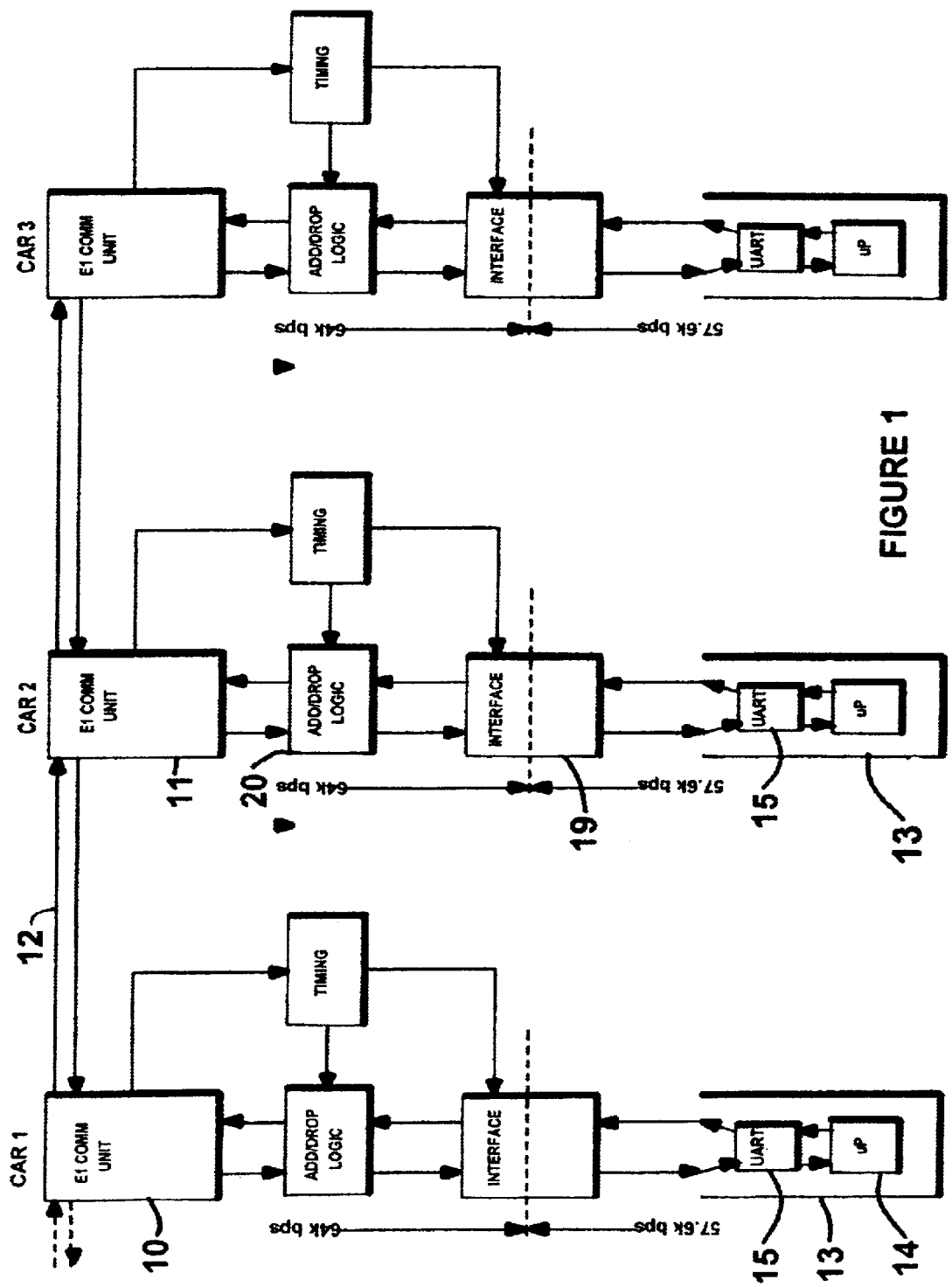
FIG. 1 is a block diagram showing the connection of the E1/T1 communications network of the present invention in a rail car communications system.
Figure 2A:
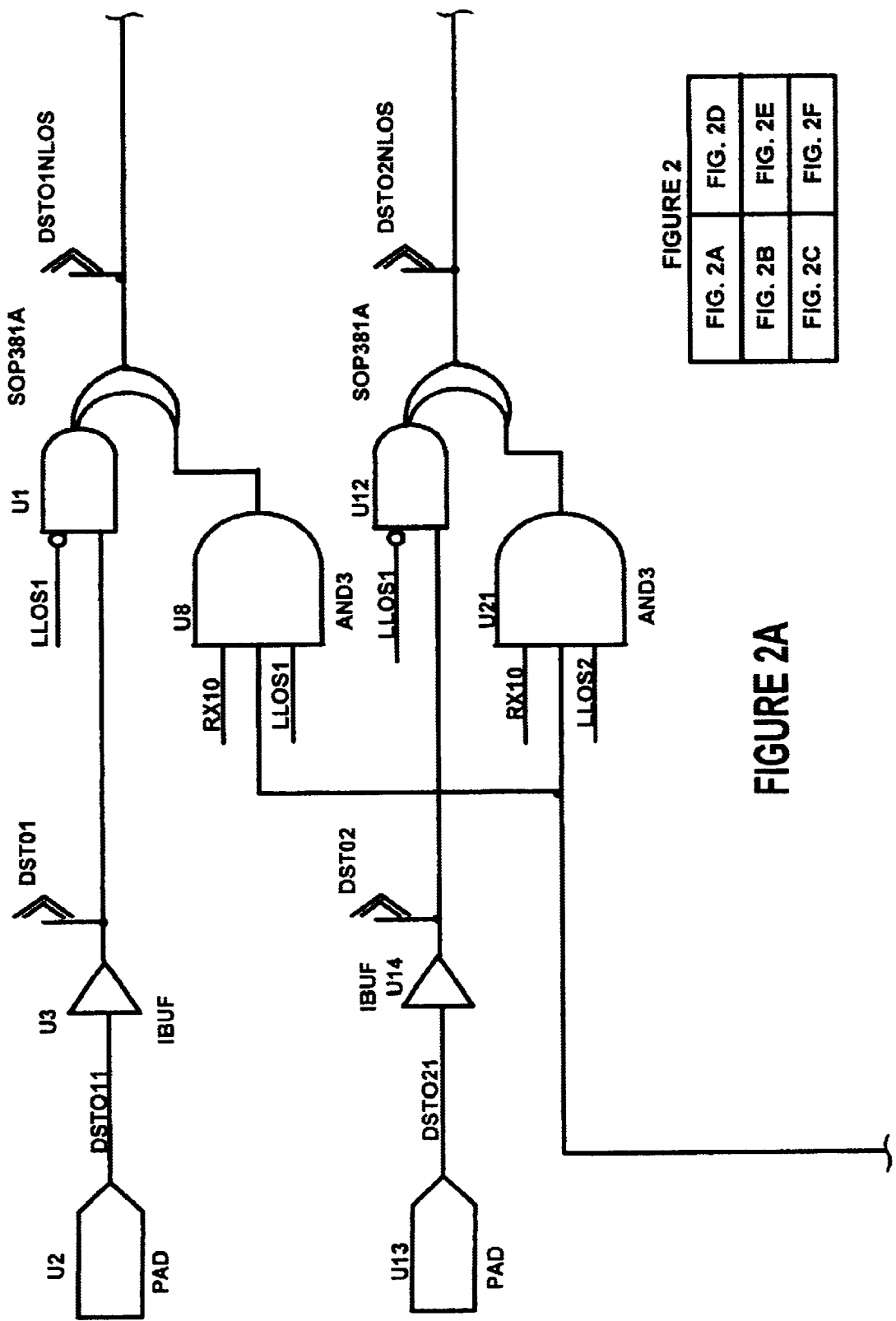
FIG. 2 is a schematic drawing showing the portion of the design where the data from the UART is inserted into, after it is conditioned by the logic in this invention, or dropped out of the E1 bit stream.
Figure 2B:
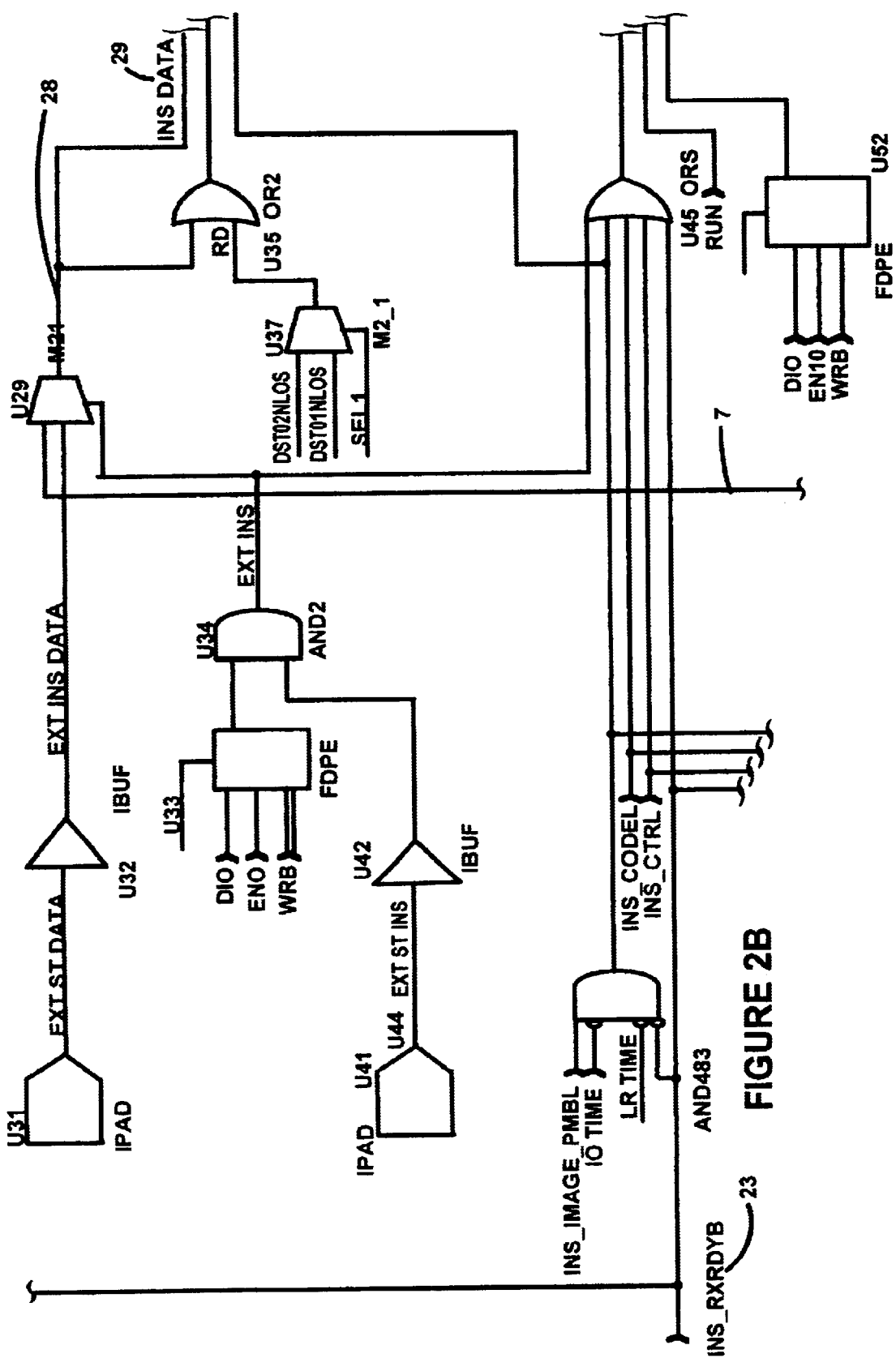
Figure 2C:
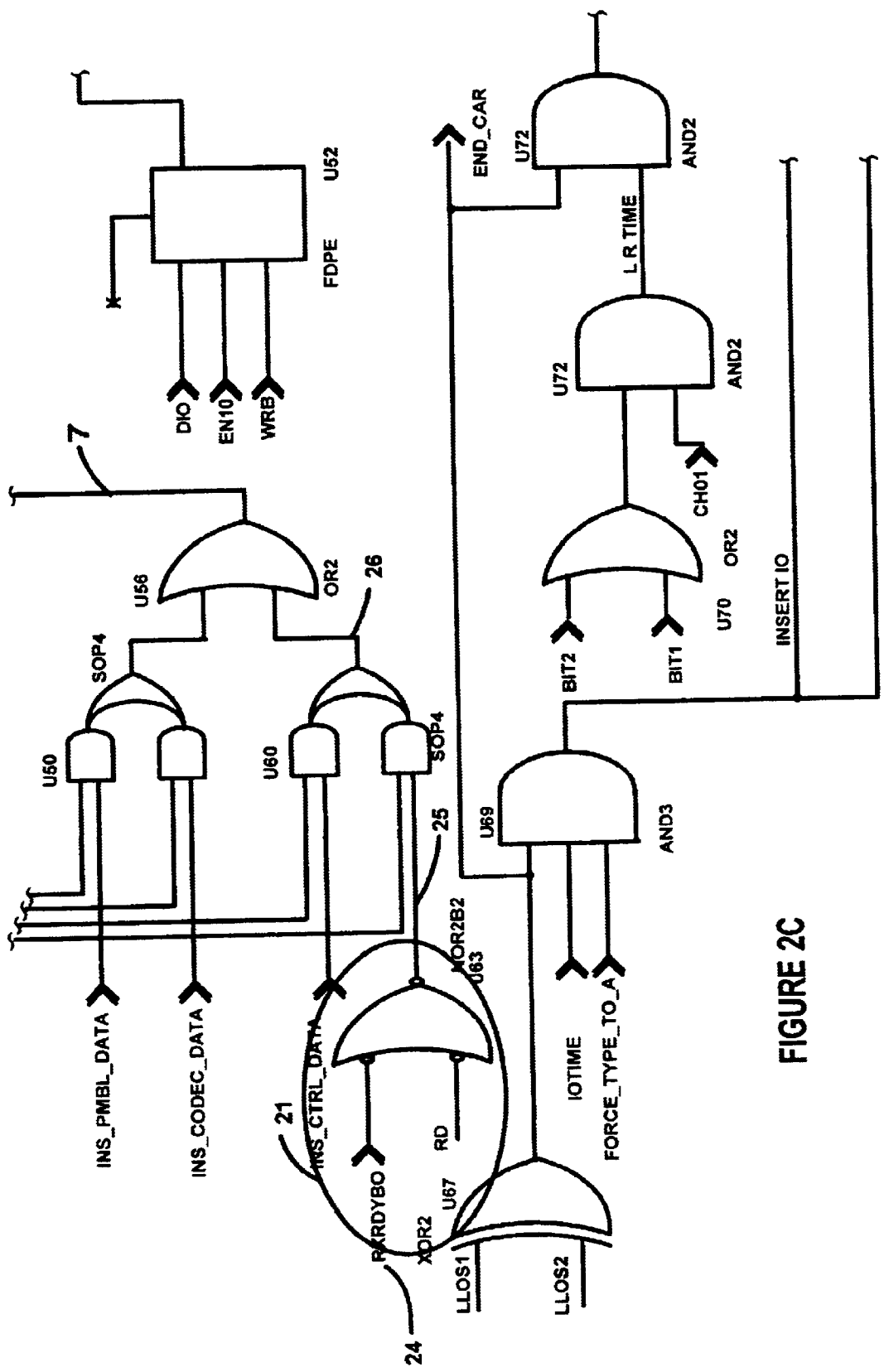
Figure 2D:
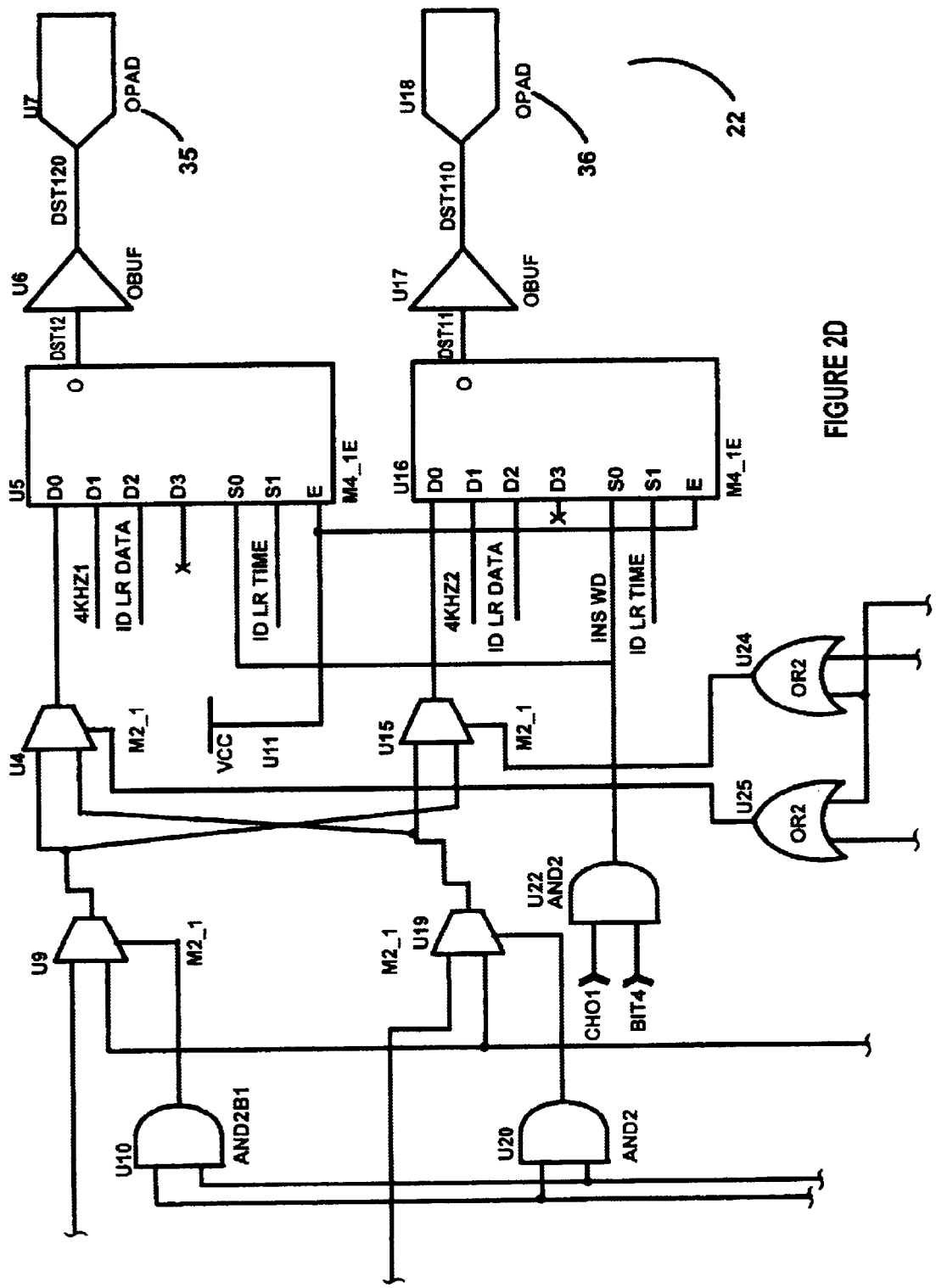
Figure 2E:
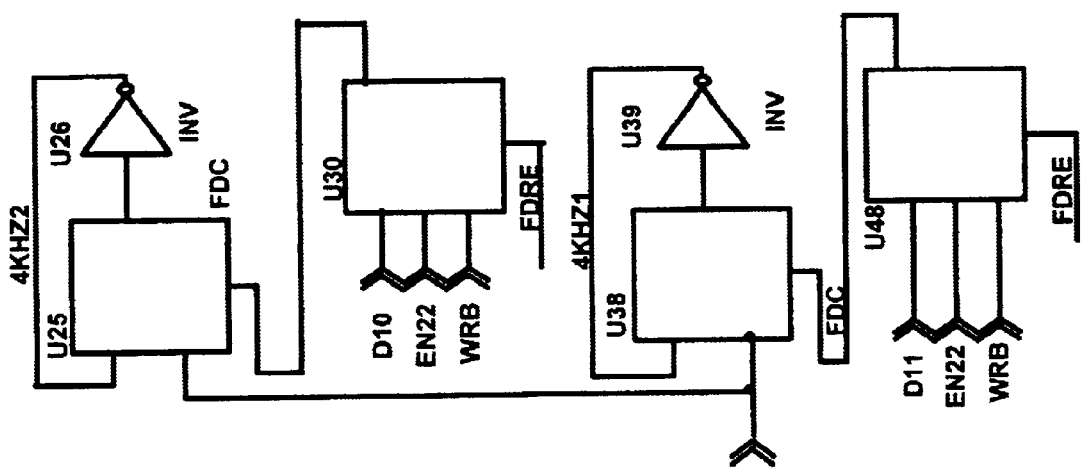
Figure 2E:
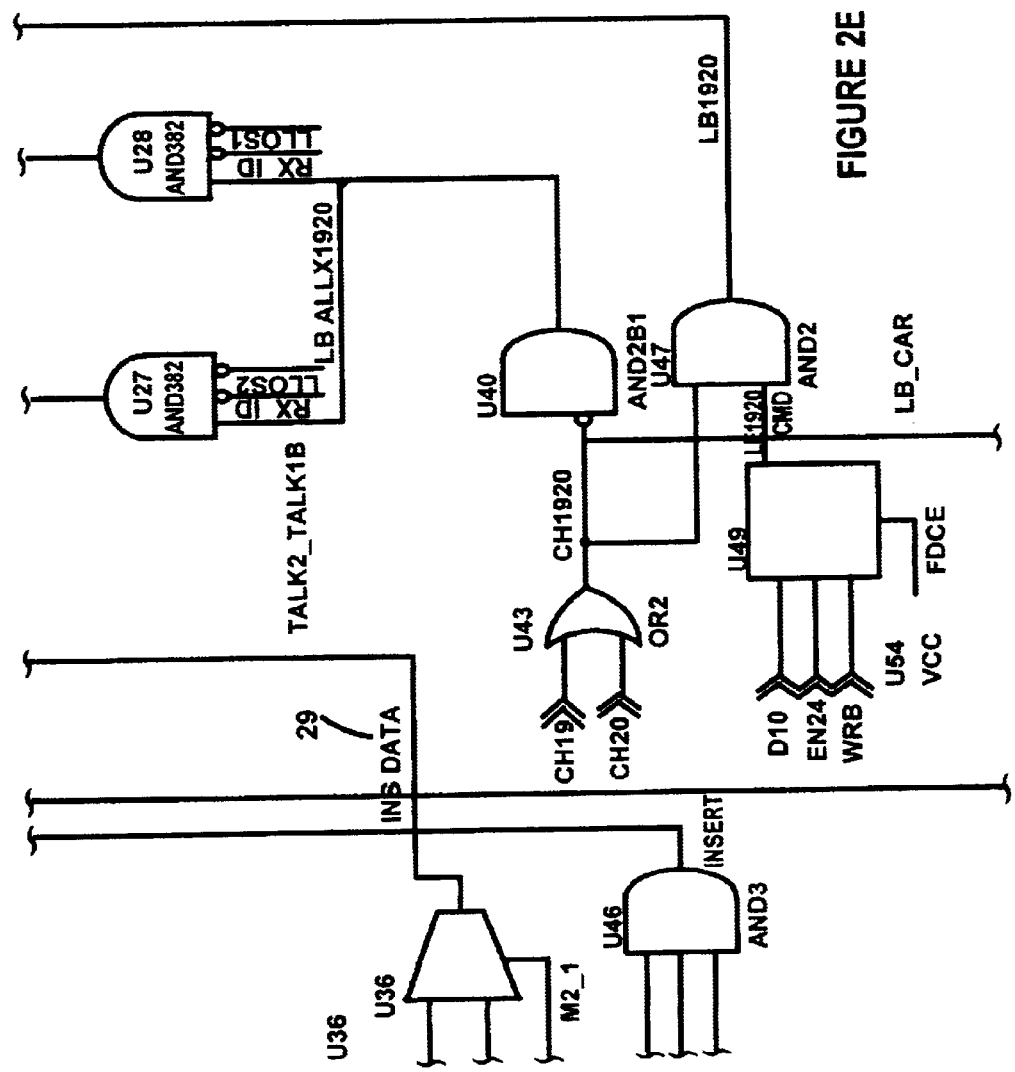
Figure 2F:
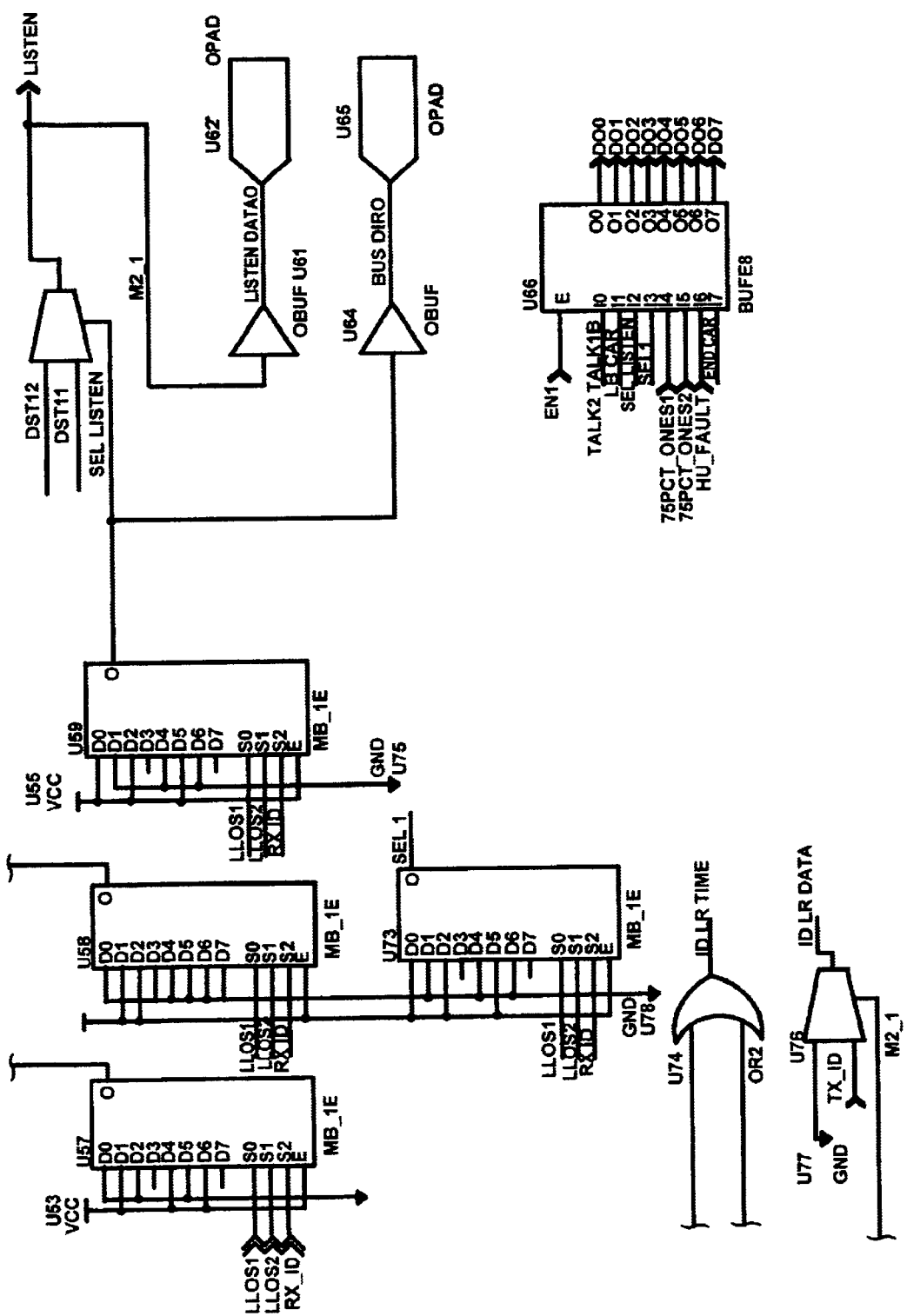
Figure 3A:
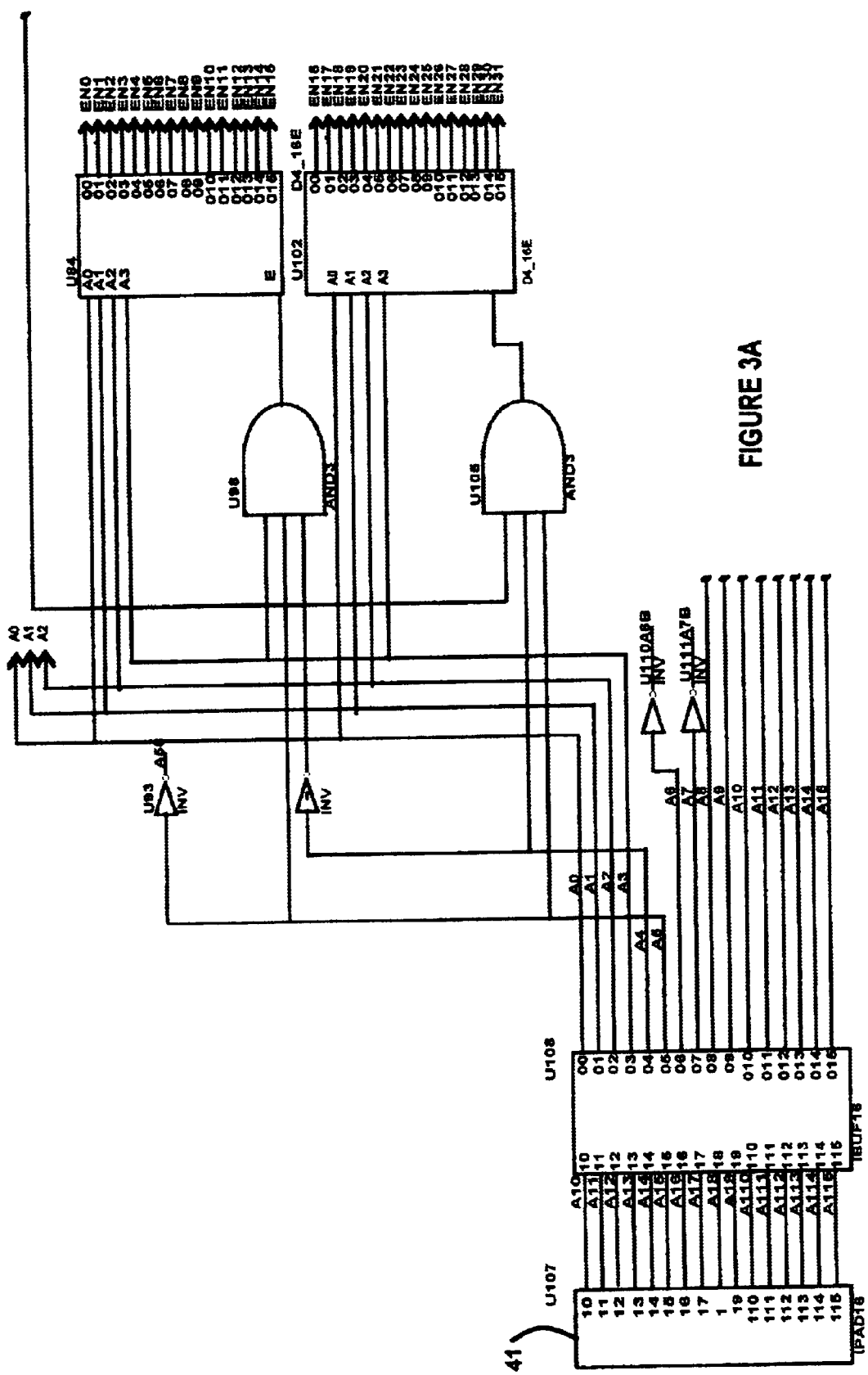
FIG. 3 is a schematic drawing of the microprocessor interface that is used to initialize the UART.
Figure 3C:
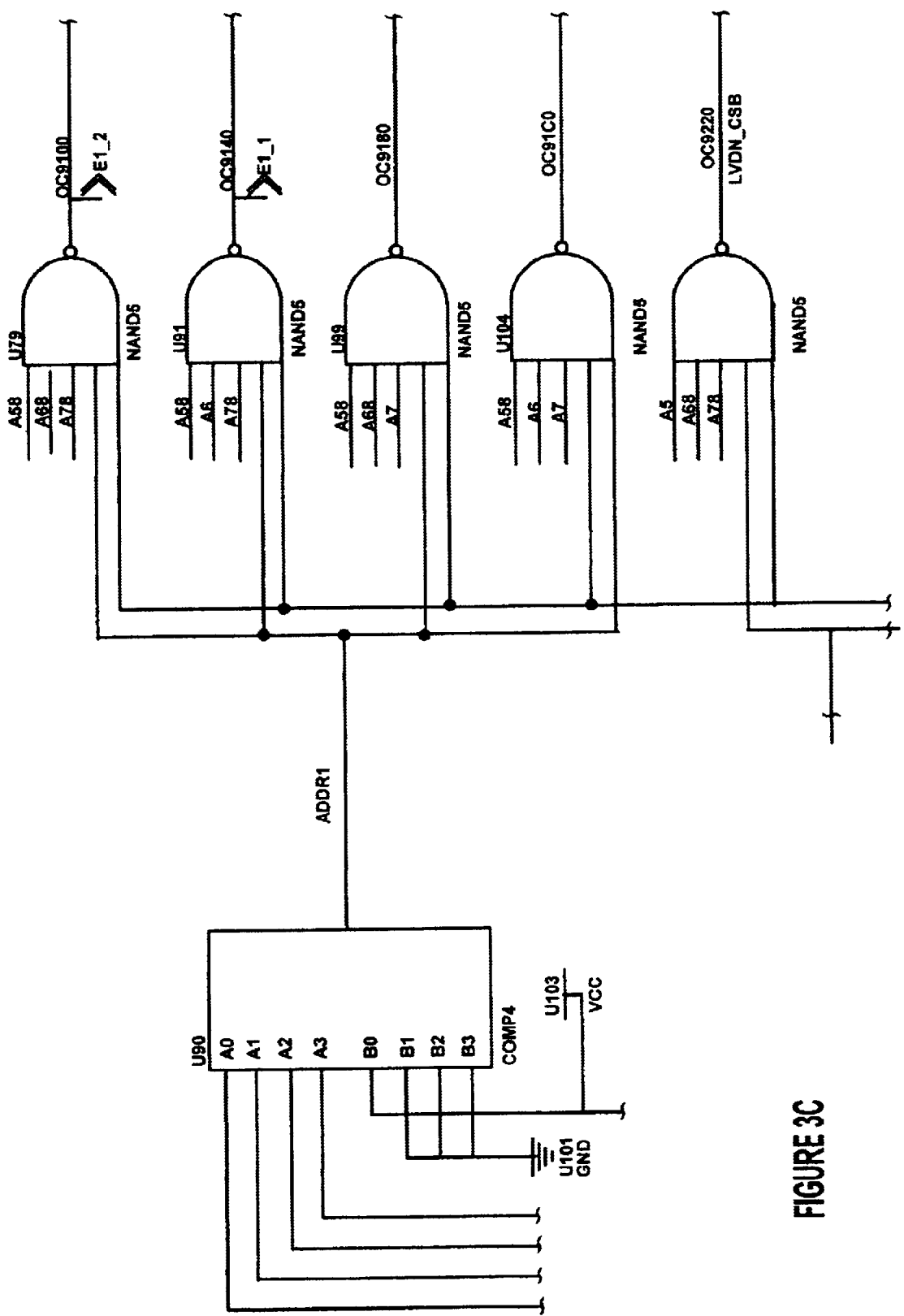
Figure 3D:
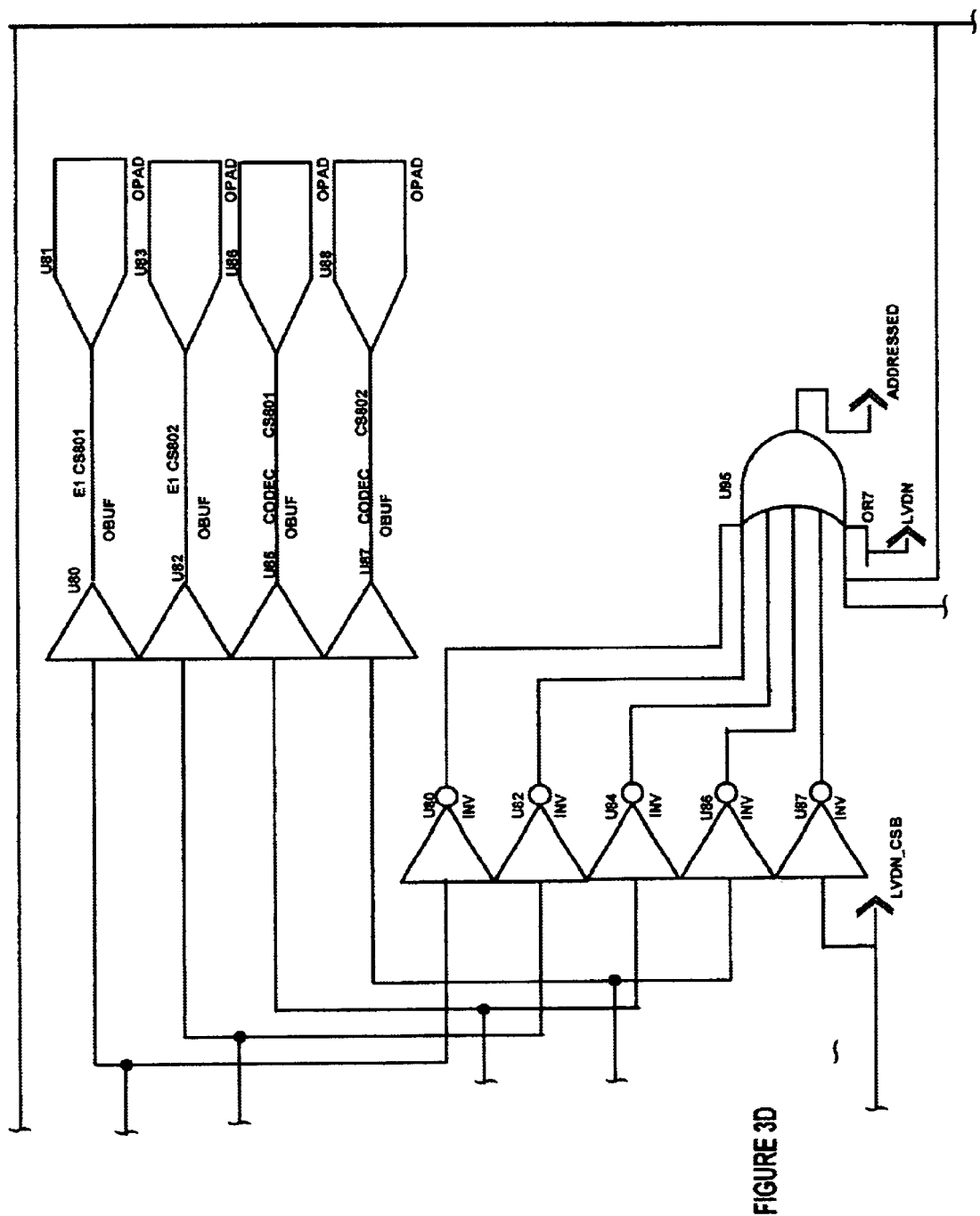
Figure 3E:
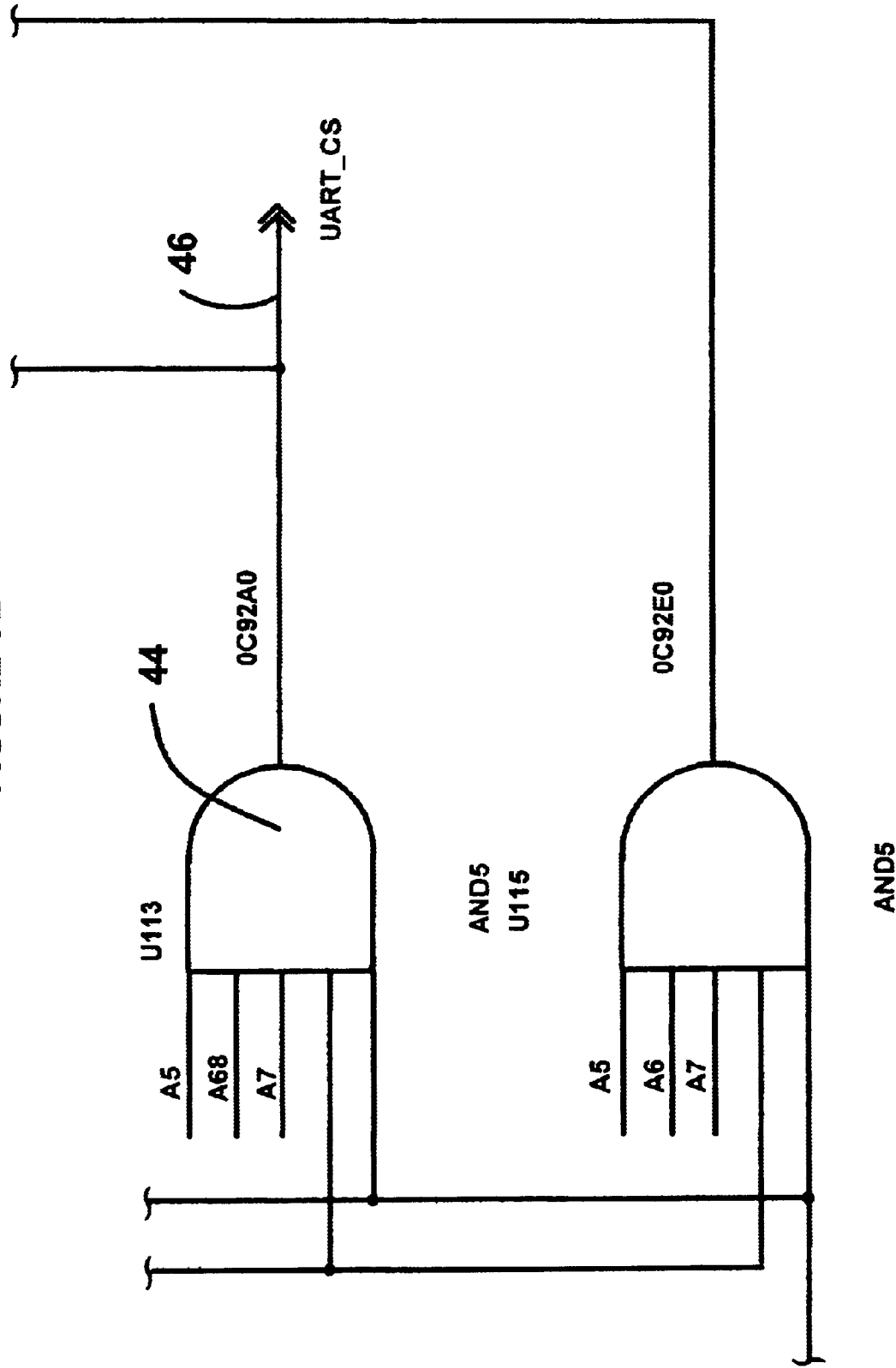

The present invention has applicability to communications between communication units where each communication unit uses a different protocol to communicate. More particularly, the present invention is useful for any E1/T1 communication system wherein there is a need to communicate with a universal asynchronous receiver transmitter, usually in conventional PC based computer hardware. The present invention is also particularly suitable to E1/T1 communication systems used in rail cars and more particularly subway cars of the type being operated by the New York City Transit Authority. In the applications where the present invention may be used, there are typically two or more communication devices each of which can preferably function both as a transmitter and a receiver. Frequently, it is desired that a UART be capable of communicating with one or more of these E1/T1 protocol based devices. As seen in FIG. 1, these communication devices usually have a first E1 or T1 communication unit 10 that is in communication with a second E1/T1 communication unit 11. Additional E1/T1 communication units may also be present in the network as desired. The E1/T1 communication units may be in communication with each other by means of E1/T1 data lines 12 or through a wireless network. In one application, a rail car, the cars pass control data and voice data to and from each other during operation of the car using the E1/T1 communication units and the E1/T1 data lines.

For various reasons there may be a need for a conventional hardware device 13 to be in communication with an E1/T1 communication unit. This communication is typically through a bi-directional data stream. The conventional hardware device communicates the data stream using a data protocol different from the protocol used by another communication unit, for example, the E1/T1 communication unit. In one embodiment each E1/T1 communication unit may have a conventional hardware device in communication therewith. Alternatively, less than all of the E1/T1 communication units in the network may have a conventional hardware device in communication therewith. The hardware devices 13 are typically a motherboard with at least one microprocessor 14 present. In addition, to the microprocessor, the hardware is electrically connected to a UART (universal asynchronous receiver transmitter) 15. Preferably, the microprocessor and the UART are on a motherboard 13. The motherboard may have additional features or devices connected thereto, such as RAM, a sound card, a video card, a hard drive or other storage device, a modem or other conventional devices connected thereto.

The UART of the hardware device is used for serial communications (COM 1–4) by the hardware device, The UART is similar those found on personal computers (PCs). The asynchronous UART data, is interfaced to an E1/T1 channel so that the data can be translated to the E1/T1 protocol and thus received in a form that can be utilized by the E1/T1 communication unit. The UART transmits and receives at a rate of preferably 50 baud to as high as 115.2 k baud if two channels are employed. More preferably, the UART transmit and receive rate is 67 baud to 115.2 k bps. In a most preferred E1/T1 embodiment, the data is transmitted and received at 56.7 k bps. The E1/T1 channel in the E1/T1 communication unit operates synchronously at 64 k (128 k if two channels are used). In view of the differences in the baud rate and the fact that one communicates synchronously and the other asynchronously there is an interface 19 present to facilitate the translation of data from parallel to serial and serial to parallel. The interface device converts the serial data stream from the first communications format, typically an E1/T1 format, to a second communications format, 8 bit parallel transfers, typically to a UART. It should be noted that the hardware translation is preferably serial to parallel and parallel to serial and the conversion is the restrictions of the devices timing. The present invention allows the system to eliminate the translation step that is required by the prior art systems.

The UART can be of the type similar to a ST16C550 UART made by EXAR Corporation, with 16-Byte FIFOs (first-in-first-out buffer memories). The preferred UART can be a universal asynchronous receiver and transmitter with 16 byte transmit and receive FIFO. It is desirable that there be a programmable baud rate generator that is provided by selecting transmit and receive clock rates from within the UART. In addition, on chip status registers preferably provide the error conditions, type and status of the transfer operation being performed. The UART should, but it is not required, to also preferably have modem control capability, and a processor interrupt system that may be software tailored to the desired requirements. In addition, it is desirable but not required, that the UART provide internal loop-back capability for on board diagnostic testing.

FIG. 1 is a block diagram showing the connection of the E1/T1 communications network that may be implemented in accordance with the present invention. For convenience, but not as a limitation as to the use of the invention, the E1/T1 communication units are each shown in a rail car communications system. For purposes of this example, Car 1, Car 2 and Car3 are representative of a train consisting of three cars, although there may be more or less. The three rail cars are joined with an electrical connector 12, which has two pairs of wires for the E1/T1 communications. The dotted oval 17 on Car 2 shows only the basic building blocks of the system where the hardware and firmware associated with the E1 communications are indicated in what is known in the preferred embodiment as the ARM board (Advanced Rail Multiplexer board). The block 13 represents a motherboard with a standard "off the shelf microprocessor board with a serial communications port implemented with a UART 15. The UART 15 is initialized by the microprocessor's software according to the UART's manufacturers instructions, although most manufactures have generally the same (or nearly the same) initialization sequence. The result of the initialization is a baud rate ranging from as low as about 67 baud to as high as about 115.2 k baud. In the preferred embodiment 57.6 k baud was used. Block 19 represents the interface between the UART and the E1/T1 bus.

In the preferred embodiment, the E1 protocol of the communication unit 10 provides, 32, 8 bit channels (256 bits) every 125 microseconds, i.e., 8 bits in 1 channel in each 125 microsecond frame sends 64 k bits per second. For the T1 protocol there are 24 channels instead of the 32 of the E1 protocol. It is that rate into which the 57.6 k baud data must be inserted and dropped while still maintaining synchronization. The add/drop logic 20 is part of a typical E1/T1 system that "drops" the selected channel's data into a register for later use or adds (inserts) a registers data into the select channel for transmission into the E1/T1 channels bitstream.

FIGS. 2, 3, 4 and 5 are schematic drawings of the hardware implementation of the interface 19 shown in FIG. 1. FIG. 2 is a schematic of the preferred design that performs the add/drop function on the E1 communication system. The circuit shown in FIG. 2 uses the data To/From the UART and the E1 timing signals and inserts the UART data into the UART stream. The encircled logic 21 shows where the RXRDYB (the negative logic for RXRDY true) signal is presented to the add/drop logic for insertion into the E1/T1 bit stream at the proper time in the E1/T1 frame/channel/bit. The other encircled logic 22 shows the logic that either passes data or inserts it into the E1/T1 channel, The remainder of the schematic deals with the state controller that provides the logic required for this and other features of the E1/T1 system design. The signal, INS_RXRDYB 23, is a timing signal that lasts for one bit time. It allows the RXRDYBO (the O stands for output) signal's level (0 or 1) to be inserted into the E1/T1 bitstream (in this case bit 3 of channel 1). RXRDYBO is the signal, which tells whether the data being inserted into the channel (channel 11 in the present example) is valid or garbage. The data will be inserted into the correct bus 25 or 26 depending on which is the talk or listen bus. The signal flow is from 24 to bus 25 where it is enabled by 23, then via 26 and 27 through U29 and via 28 through U38 where it becomes the "insert data", 29. It is then routed through either, U9, U4 and U5, or through U19, U15 and U16 (depending on bus direction to the output 35 or 36). There it is input to an E1/T1 framer chip (the IC normally used for E1/T1 data transmission).

As seen in FIG. 3 there is an address bus decoder and shows an interface between the microprocessors address bus 41 and 45 and the decoding logic 42, 43 and 44 to generate the chip select signal that allows the UART to communicate with the microprocessor. This provides the necessary communications for initializing the UART's data rate to, for example 57.6 k baud. The circuit shown in FIG. 3 decodes the microprocessor's address bus and provides the "chip select signal" 46 to the UART so that the microprocessor can initialize it to the desired baud rate.

Figure 4B:
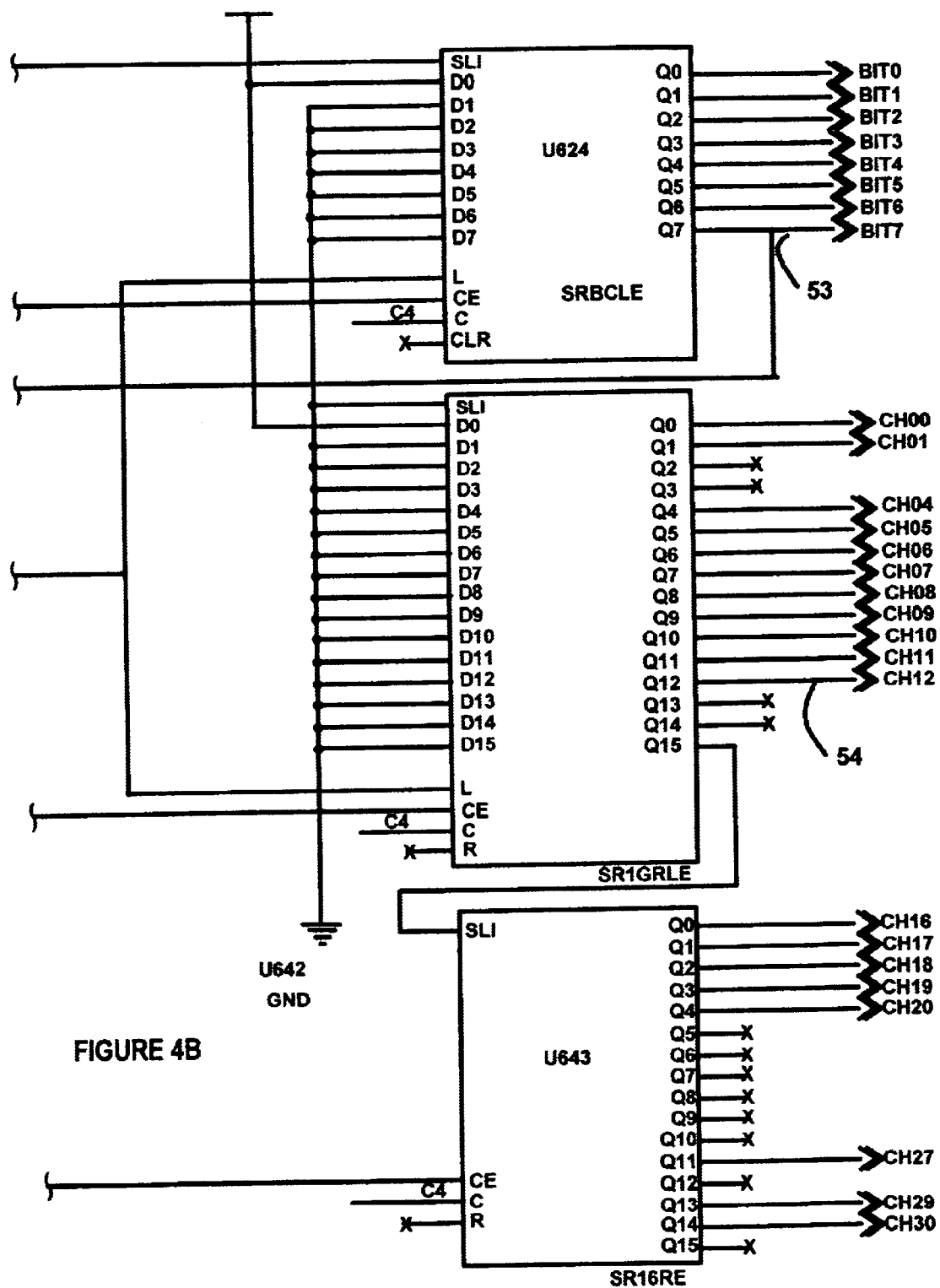
FIG. 4 is a schematic drawing that provides the basic E1/T1 timing signals that synchronize the logic with the E1/T1 data stream.
Figure 5A:
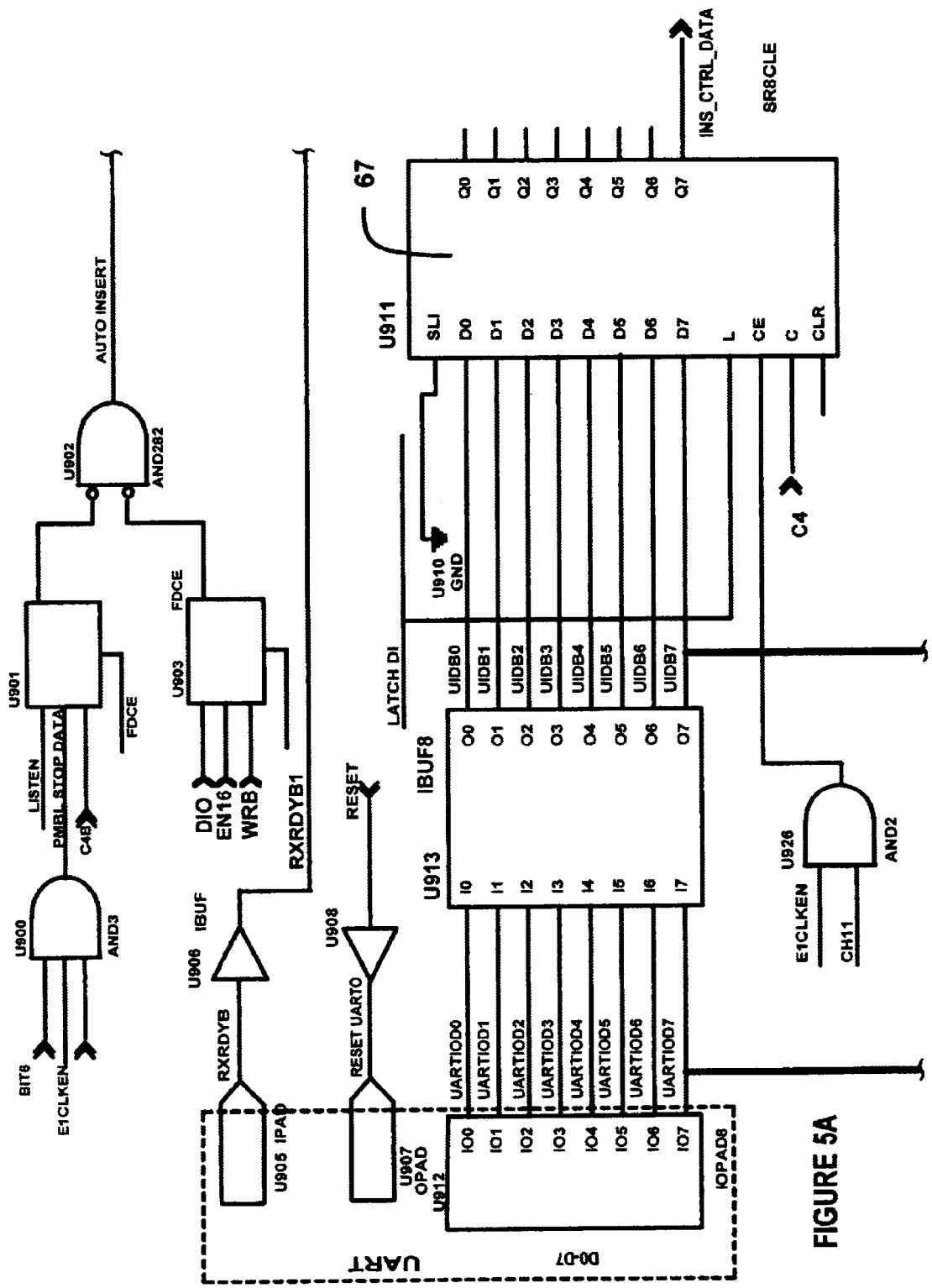
FIG. 5 is a schematic drawing showing the logic for and communications with the UART.
Figure 5C:
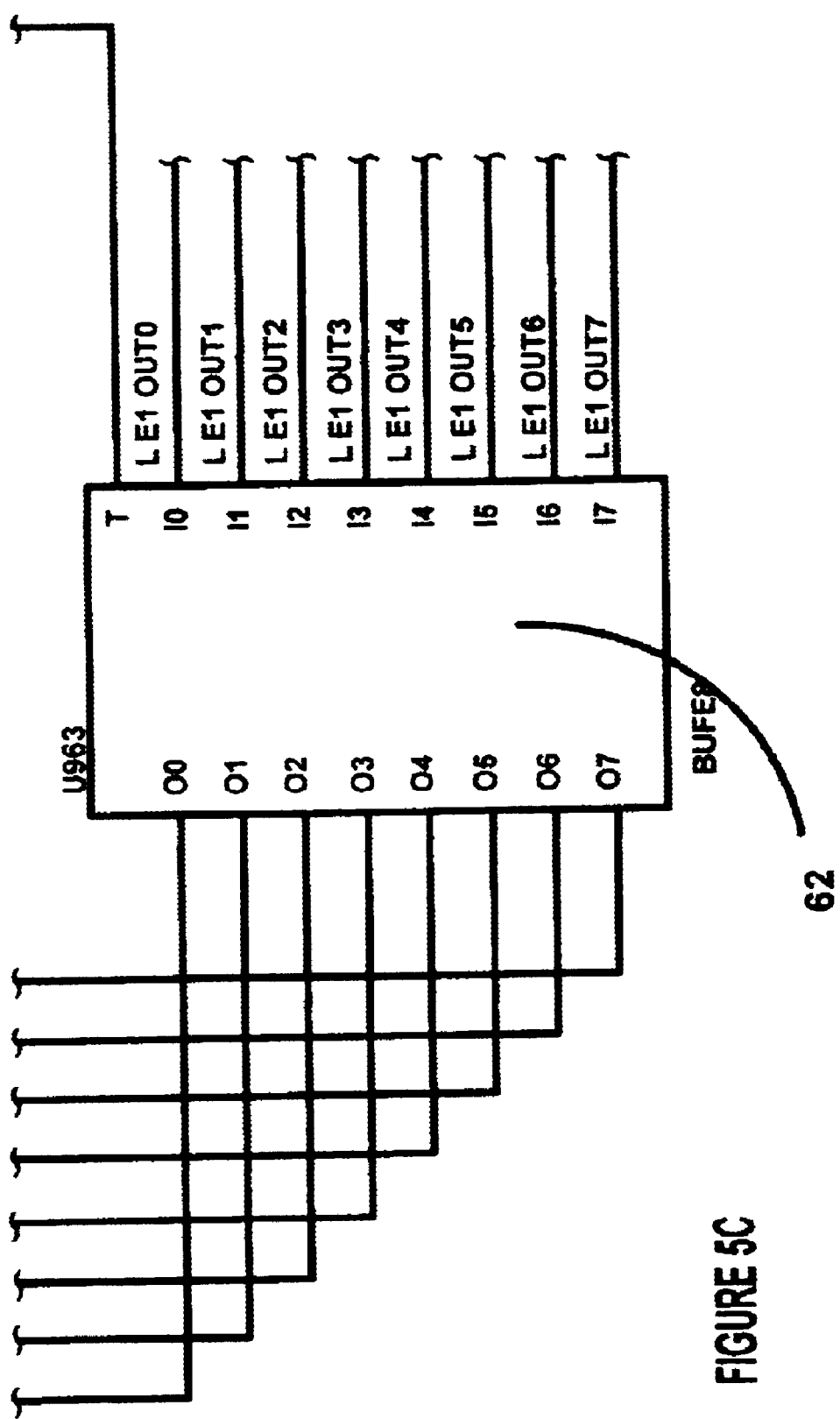
Figure 5D:
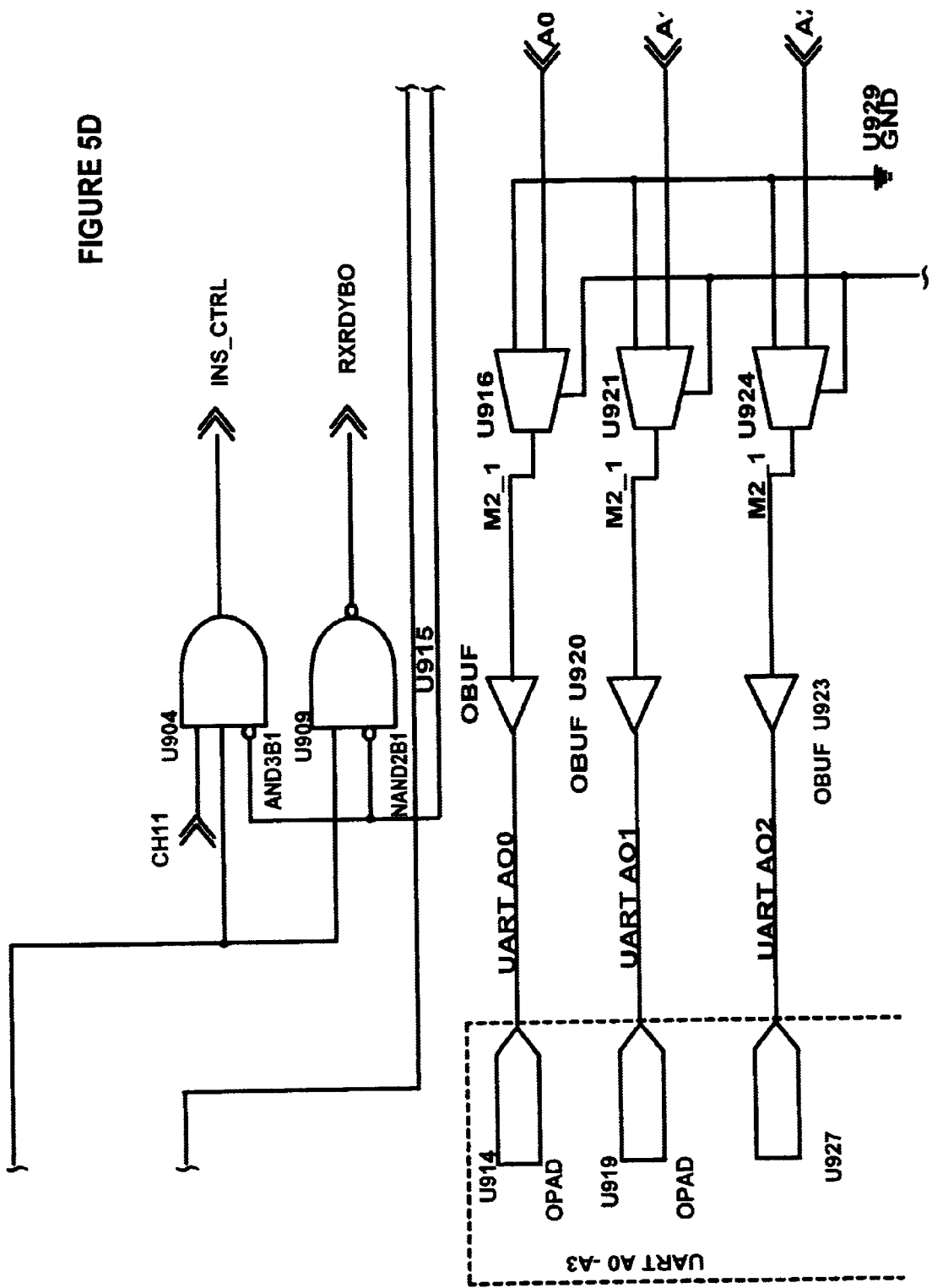
Figure 5E:
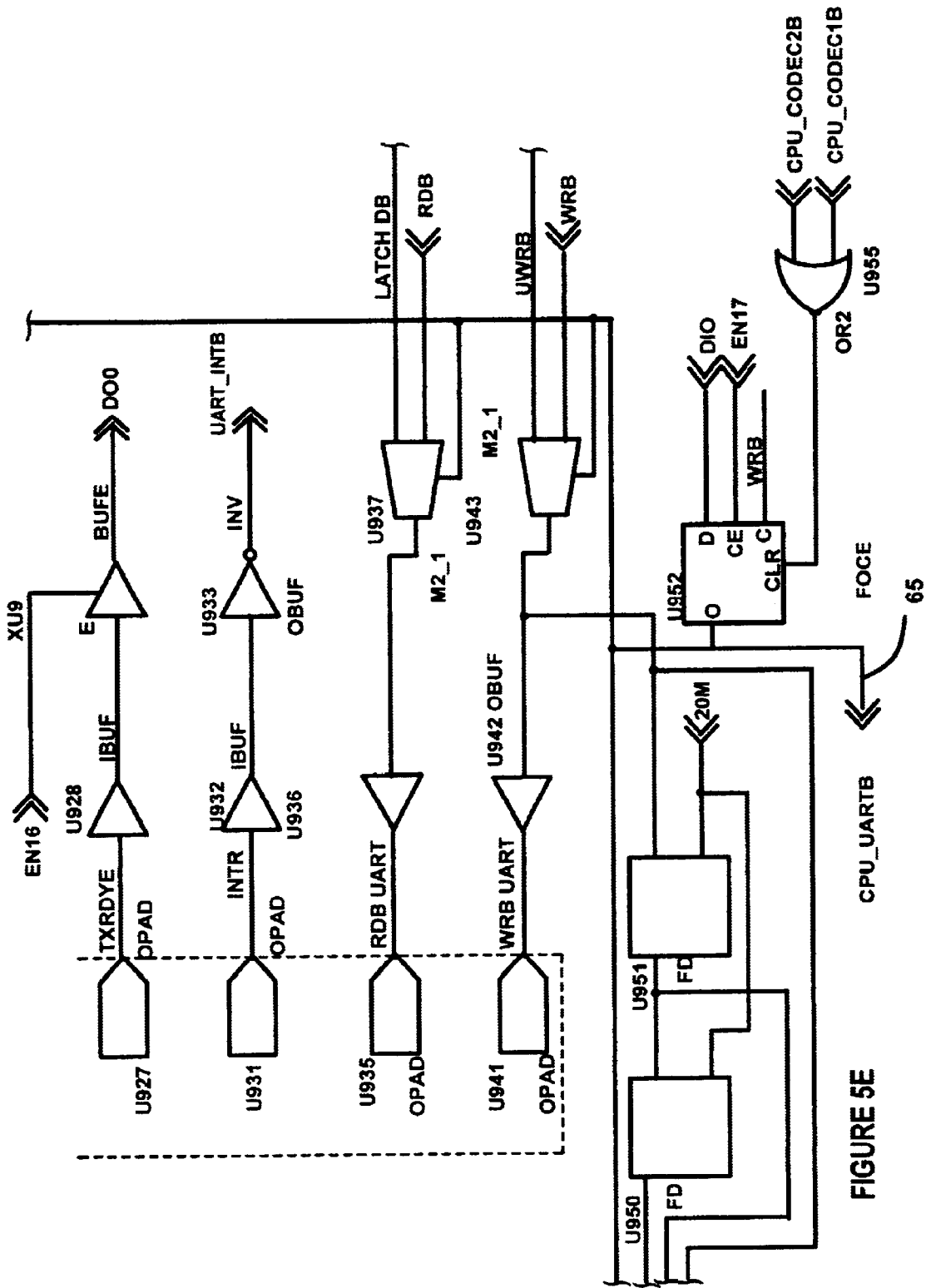
Figure 5F:
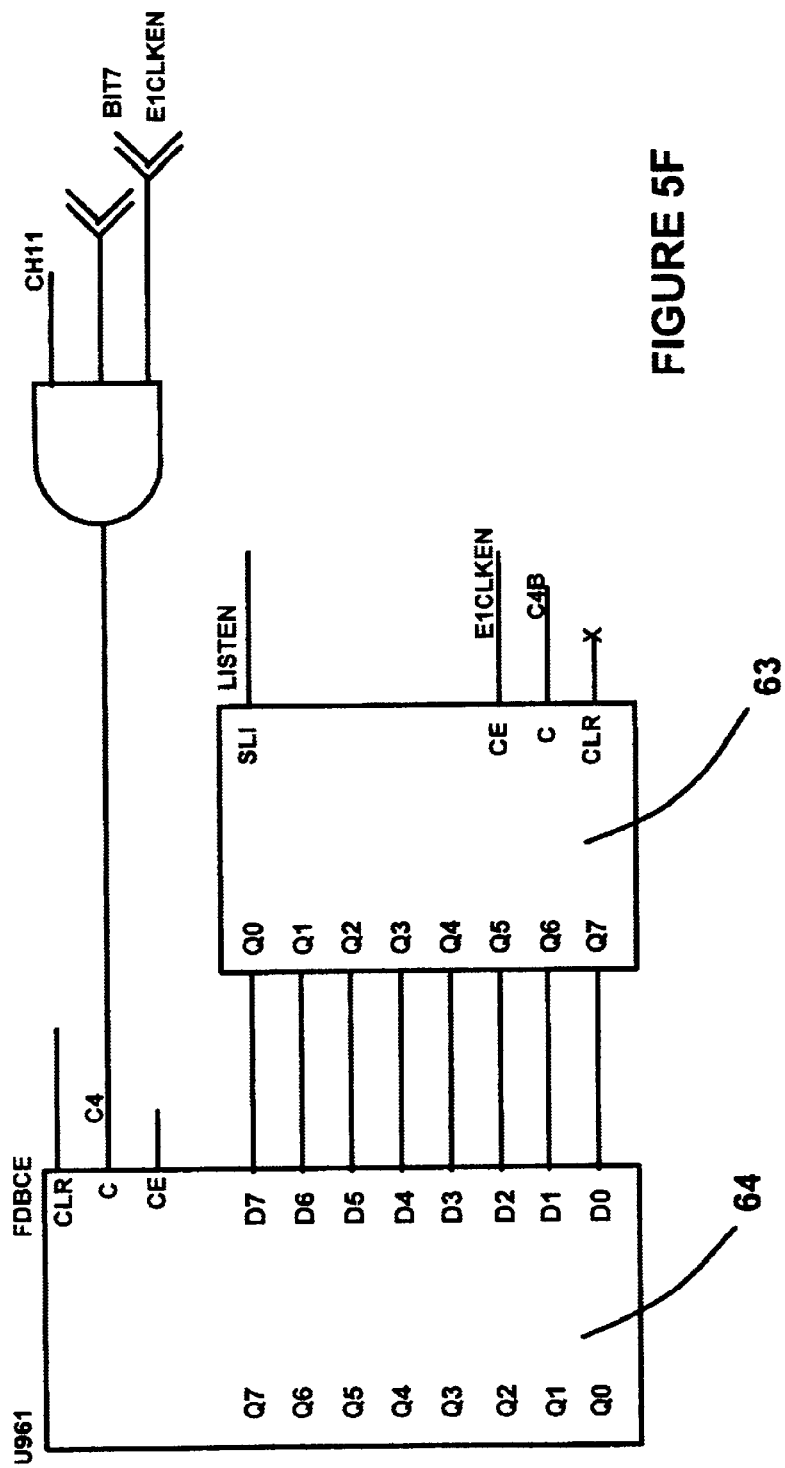
Figure 5G:
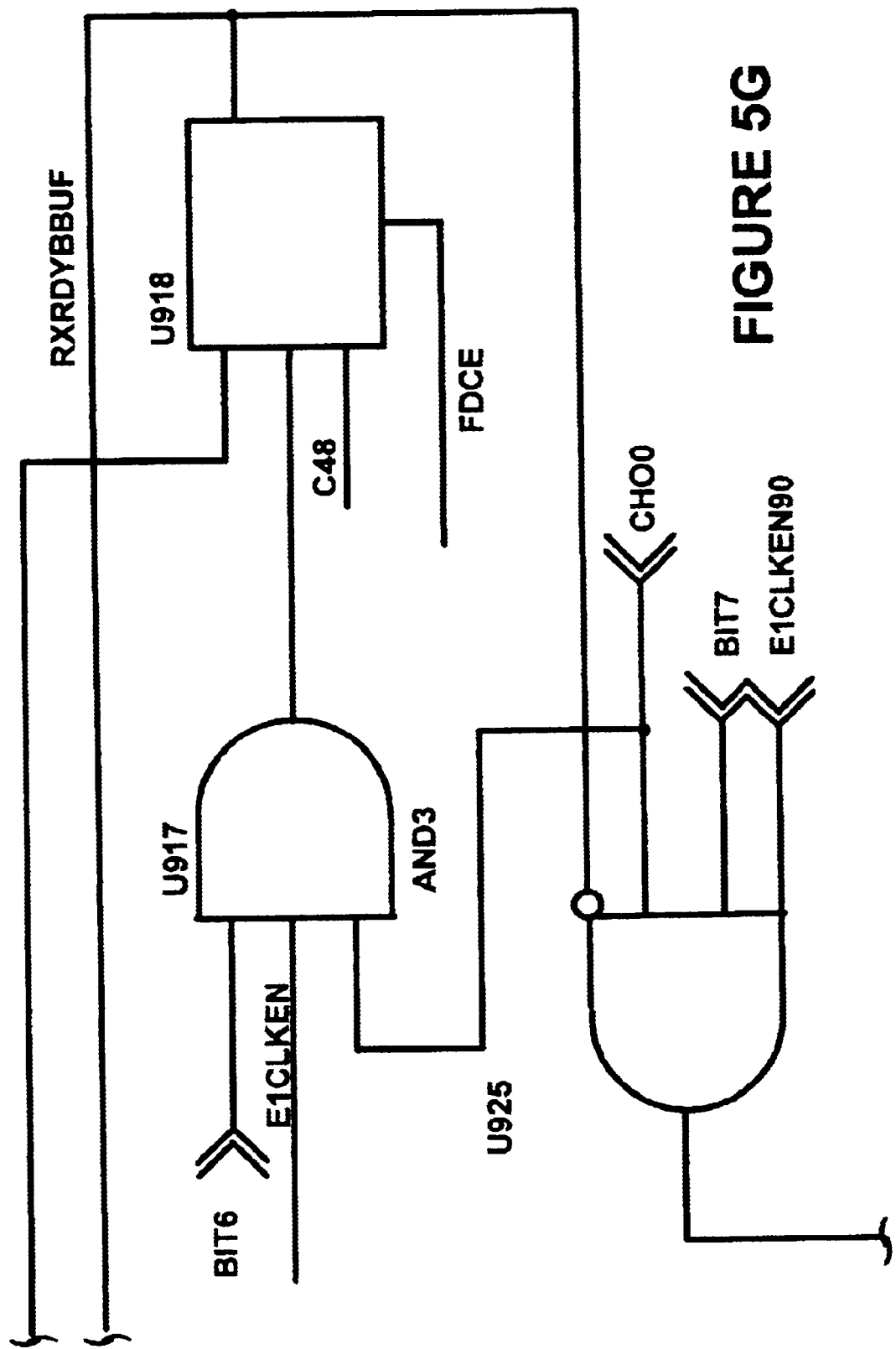
Figure 5H:
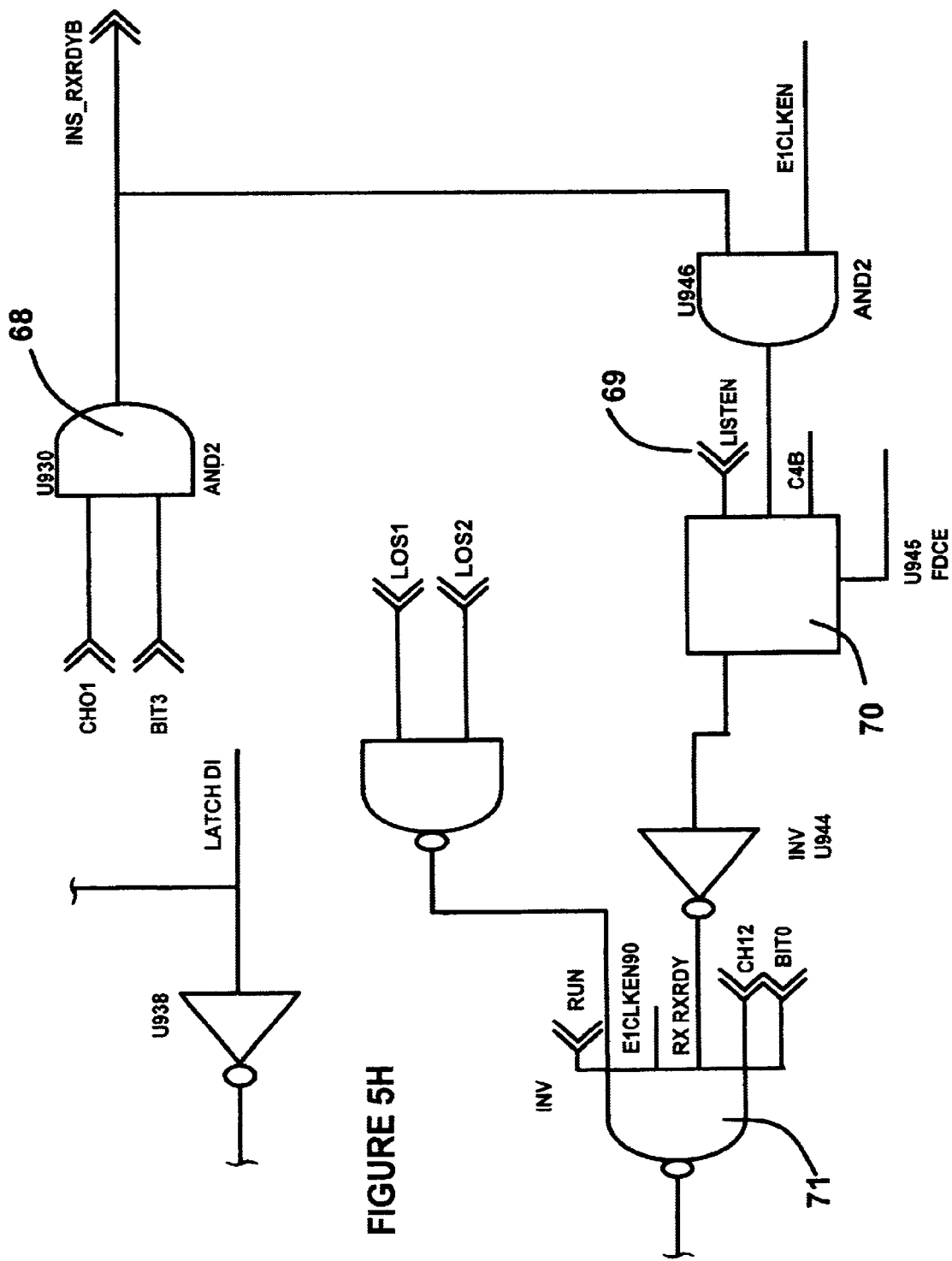
Figure 5I:
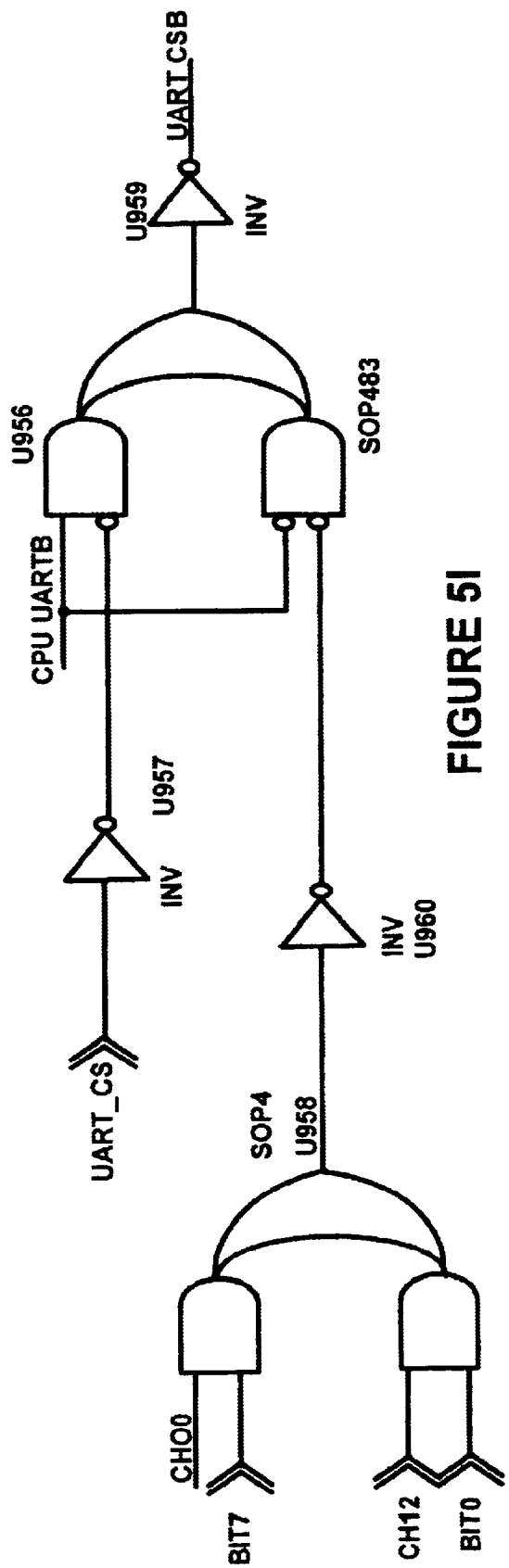

FIG. 4 shows a circuit that has, as its inputs, the timing signals provided by the E1 framer chip. There is a frame sync 51 and a 4 MHz clock 52. They are processed to form the bit count 53 and channel count 54 necessary for the add/drop logic to synchronize with the E1/T1 data stream. The circuit shown in FIG. 5 uses the frame synchronization pulse from the E1/T1 framer chip and the 4 MHz clock to develop the channel and bit signals. These signals are the basic E1/T1 timing signals needed to put the UART bit stream into the E1/T1 channel that is designated for the UART data.

FIG. 5 depicts the circuit for the UART to microprocessor and UART to E1 interface. The selection of which interface is connected to the UART comes from the latched microprocessor command at U952 and becomes signal CPU_UARTB (cpu/not uart) 65. If CPU is selected then data from the processor will pass through 61, otherwise the serial data from the Eldata stream in the SSR (serial shift register) 63 will be latched 64 and passed through 62, to the UART. Similarly, the data from the UART will be selected by CPU_UARTB, and read by the microprocessor 66 on its data bus. The data from UART is parallel loaded the SSR 67. That is the data that will be inserted into the E1 bit stream. The received RXRDYB from the E1 bit stream appears on the LISTEN signal. It is timed by the combination of timing signals, channel 1 and bit 3 at U930 (68). This is conditioned in U945 (70) and gated through U940 (71) and becomes the write signal to the UART. The data will be written to the UART if the RXRDYB is active and therefore indicates there is meaningful data and not written if it is inactive, indication that the E1 bitstream data is garbage.

In the preferred embodiment, the reception ready (RXRDY) signal indicates when the UART's receive FIFO has data. After the last byte of data is taken the signal becomes inactive until there is another byte in the FIFO. If the FIFO is read when the data RXRDY signal is inactive the data is, as it is called in the industry, garbage. But if the garbage is sent over the E1 channel in a byte and the RXRDY signal is sent at the same time as a qualifer, in a single bit in another channel, then at the receiving end, only the bytes received together with an active RXRDY signal will be written into the UART's transmit FIFO. Thus, even if bad data is sent it never reaches the microprocessor because it is never written into the receiving UART's FIFO because it is blocked by the absence of an active RXRDY signal.

In operation, the microprocessor (uP) will initialize the RS232 serial channel on the uP board and the asynchronous receive mode on the UART to 57.6 kbps., 8-N-1 This will result in the transmission of 8 data bits and 2 overhead bits at the baud rate of 57.6 kbps., an actual data rate of 46.08 kbps. The data will be then be fed through the 64 kbps. control channel (8 bits transmitted at 8 kHz) over the E1 ARM bus. The 16550 UART's 16 byte FIFO will be loaded by the uP at the rate of 46.08 kbps. Since the E1 channel operates at a faster rate (64 kbps.) than the incoming data, some of the bytes transmitted over the E1 channel may contain meaningless data, That meaningless data will have to be "thrown away" by the receiving E1 unit so there will be an independent preamble bit, called RXRDYB, to indicate that the data is valid.

The 16550's RXRDYB output is normally used with direct memory access (DMA) transfers to indicate that there is one (or more) character(s) in the FIFO, available for transfer. This signal therefore provides the information necessary for the systems E1 interface board's RXROYB bit. The bit is low if the data is valid (the FIFO has characters) or high if the data is invalid (the FIFO is empty). The data is clocked out of the FIFO using the 64 kHz E1 channel bit timing, The faster (64 kbps.) clock will cause the RXRDYB to indicate that the FIFO is frequently empty, in fact empty at a rate of 17.92 kHz (64.00 kHz minus 46.08 kHz).

The receiving unit will read the data (per system requirements) and transmit (or retransmit it) it using the 64 kbps., E1 timing. The 16550's clock, input to the transmit FIFO, uses the 64 kHz channel bit timing, but the clock will be gated with the RXRDYB bit (received in channel 1, bit 3). Effectively, the 64 kHz clock, when combined (beat) with the RXRDYB signal, will result in a 46.08 kbps, clock rate. This re-synchronizes the RS232 channel's timing because the FIFO will be loaded at the same rate as the uP is unloading it. There is usually a timing difference between the RS232 data being transmitted and received by the UARTs and the timing of the microprocessor's transfers of data to or from the UART. The standard RS232 handshake control signals are available to compensate for that and may be used, but are not necessarily required, depending on the unique system demands. The requirement that must be met by the processor, is to transfer the data in before the FIFO is full, and not transfer data out unless the FIFO in not full, or the result will be lost data.

For the T1 protocol the schematic drawing would be similar to the drawing of FIG. 5 showing the logic for and communications with the UART except that the T1 protocol has 24 instead of 32 channels.

I claim:

1. A method of communicating between a communications device using an E1/T1 protocol and a communications device having a universal asynchronous receiver transmitter comprising:

having a microprocessor initialize a serial channel on a universal asynchronous receiver transmitter and an ARM board to a selected baud rate;

transmitting data bits from said universal asynchronous receiver transmitter at the selected baud rate along with a preamble bit;

feeding the data bits through a control channel over an E1/T1 ARM bus to a receiving unit;

ignoring any data bits received by the receiving unit using the E1/T1 protocol that do not have the active preamble bit present;

inserting a data bit into an E1/T1 communication system's bitstream one bit at a time using a timing signal.

2. The method according to claim 1 wherein the UART emits a signal to said ARM bus when its FIFO has data available to be transmitted, said signal becoming inactive when no data is present.

3. The method according to claim 1 wherein the preamble is a (RXRDY) signal.

4. The method according to claim 3 wherein the receiving unit reads the data and transmits it using 64 kbps., E1/T1 timing.

5. The method according to claim 4 wherein the UART's clock, input to the transmit FIFO, uses the 64 kHz channel bit timing, and the clock is gated with an RXRDYB bit.

6. The method according to claim 5 wherein the 64 kHz clock, when combined with the RXRDYB signal, results in a 46.08 kbps, clock rate.

7. An interface device for permitting communication between a communications device using an E1/T1 protocol and a communications device having a universal asynchronous receiver transmitter comprising: a circuit that receives a data To/From signal from the UART and an E1 timing signal from a communications device using an E1/T1 protocol and wherein said circuit receives the UART data from a UART bitstream and inserts said data into an E1/T1 channel of the communications device using an E1/T1 protocol.

8. The interface device according to claim 7 wherein a state controller provides the logic required for the interface to operate.

9. The interface device according to claim 8 wherein the timing signal lasts for one bit time.

10. The interface device according to claim 9 wherein an RXRDYBO signal determines whether the data being inserted into the channel is valid or garbage.

11. The interface device according to claim 10 wherein the data signal is input to an E1/T1 framer chip.

12. A system for permitting an E1/T1 communication system to communicate with a hardware device having a universal asynchronous receiver transmitter comprising a microprocessor that initializes a serial channel on said universal asynchronous receiver transmitter and an ARM board to a selected baud rate; said universal asynchronous receiver transmitter transmitting data bits at the selected baud rate along with a preamble bit, said data bits being fed through a control channel over an E1/T1 ARM bus and wherein any data bits received by the device using the E1/T1 protocol that do not have the preamble bit present are ignored, said data bit being inserted into an E1/T1 communication system's bitstream one bit at a time using a timing signal.

13. The system according to claim 12 wherein a first E1/T1 communication unit is in communication with a second E1/T1 communication unit.

14. The system according to claim 13 wherein the E1/T1 communication system is in a rail car.

15. The system according to claim 14 wherein the UART transmits and receives at a rate in the range of about 67 baud to as high as 115.2 k baud.

* * * * *